US 6,552,091 B1

(12) United States Patent
Boinowitz et al.

(10) Patent No.: US 6,552,091 B1
(45) Date of Patent: Apr. 22, 2003

(54) BLOCK-COPOLYMERIC POLYALKYLENE OXIDES CONTAINING STYRENE OXIDE, OBTAINED BY ALKOXYLATION, AND THEIR USE

(75) Inventors: Tammo Boinowitz, Essen (DE); Ellen Reuter, Essen (DE); Stefan Silber, Krefeld (DE); Joachim Venzmer, Essen (DE)

(73) Assignee: Goldschmidt AG, Essen (DE)

( * ) Notice: Subject to any disclaimer, the term of this patent is extended or adjusted under 35 U.S.C. 154(b) by 0 days.

(21) Appl. No.: 09/645,749

(22) Filed: Aug. 24, 2000

(30) Foreign Application Priority Data

Aug. 27, 1999 (DE) .......................................... 199 40 797

(51) Int. Cl.$^7$ ........................ B01F 17/42; C07C 43/20; C08K 5/00
(52) U.S. Cl. ...................... 516/30; 106/31.86; 106/476; 106/499; 510/356; 516/76; 516/78; 516/79; 516/920; 526/911; 568/607; 568/608
(58) Field of Search ............................... 516/30, 76, 78, 516/79, 920; 510/356; 568/607, 608; 528/123; 526/911; 106/31.86, 476, 499

(56) References Cited

U.S. PATENT DOCUMENTS

| | | | | |
|---|---|---|---|---|
| 2,677,700 A | * | 5/1954 | Jackson et al. ......... 510/356 X |
| 2,903,485 A | * | 9/1959 | Lane et al. ............. 510/356 X |
| 2,979,533 A | * | 4/1961 | Bruson et al. .......... 510/356 X |
| 3,029,216 A | * | 4/1962 | Bailey, Jr. et al. | |
| 3,101,374 A | * | 8/1963 | Patton, Jr. .................. 516/76 X |
| 3,226,352 A | * | 12/1965 | Helin et al. | |
| 3,268,593 A | * | 8/1966 | Carpenter et al. ......... 516/76 X |
| 3,560,574 A | * | 2/1971 | Frampton et al. | |
| 4,101,480 A | * | 7/1978 | Ruf ...................... 106/31.86 X |
| 4,836,951 A | | 6/1989 | Totten et al. | |
| 5,985,014 A | * | 11/1999 | Ueda et al. .......... 106/31.86 X |
| 6,245,138 B1 | * | 6/2001 | Nyssen et al. ........... 106/31.86 |

FOREIGN PATENT DOCUMENTS

| | | |
|---|---|---|
| DE | 2 225 318 | 12/1973 |
| DE | 42 25 236 A1 | 2/1994 |
| EP | 0 303 928 A1 | 2/1989 |
| EP | 0 447 896 A2 | 9/1991 |
| EP | 0 940 406 A2 | 9/1999 |

* cited by examiner

*Primary Examiner*—Richard D. Lovering
(74) *Attorney, Agent, or Firm*—Frommer Lawrence & Haug LLP

(57) ABSTRACT

The invention relates to block-copolymeric polyalkylene oxides containing styrene oxide, obtained by alkoxylation, and their use as low-foam pigment wetting agents in aqueous pigment pastes with or without cosolvent and in aqueous and low-solvent coating materials and printing inks.

19 Claims, No Drawings

BLOCK-COPOLYMERIC POLYALKYLENE OXIDES CONTAINING STYRENE OXIDE, OBTAINED BY ALKOXYLATION, AND THEIR USE

RELATED APPLICATIONS

This application claims priority to German application 199 40 797.5, filed Aug. 27, 1999, herein incorporated by reference.

BACKGROUND OF THE INVENTION

1. Field of the Invention

The invention relates to block-copolymeric polyalkylene oxides containing styrene oxide, obtained by alkoxylation, and their use as low-foam pigment wetting agents in aqueous pigment pastes with or without cosolvent and in aqueous and low-solvent coating materials and printing inks.

2. Description of the Related Art

For the dispersion of fillers and pigments in liquid media it is common to make use of dispersants in order to reduce the mechanical shear forces required for effective dispersing of the solids and at the same time to obtain very high degrees of filling. The dispersants assist in the disruption of agglomerates, wet and/or cover, as surface-active materials, the surface of the particles to be dispersed, and stabilize the particles against unwanted reagglomeration.

In the production of inks and paints, wetting agents and dispersants facilitate the incorporation of pigments and fillers, which are important formulation constituents that determine significantly the visual appearance and the physicochemical properties of coatings. Optimum utilization requires firstly that the solids are distributed uniformly in paints and inks and secondly that the state of distribution, once attained, is stabilized. In many cases, the stabilizing effect is perceived on binder components as well. This is particularly the case with acidic (styrene) acrylates, which are used, in particular, in the preparation of printing inks. In these cases, pigment wetting agents are used, whose action consists in wetting very rapidly the pigment surface, which displace the air from the surface of the pigments, and replace it by the liquid of the millbase. Especially when solids with a nonpolar surface are used in aqueous coating materials, the wetting must be assisted by wetting agents. This permits favorable development of color strength and thus virtally ideal utilization of the energy introduced.

Moreover, especially in the architectural paints industry, use is made of aqueous pigment pastes, with or without cosolvent, which are used universally for tinting in aqueous emulsion paints on an all-acrylate, styrene acrylate or silicate basis and in nonpolar decorating paints based on long-oil alkyds.

Particularly suitable for this purpose are alkylphenol ethoxylates or fatty alcohol alkoxylates, which also contribute to steric stabilization of dispersed pigment states. The high-performance alkylphenol ethoxylates have come under criticism on ecotoxicological grounds, and their use in laundry detergents and cleaning products is already banned in many countries. Similar bans may be expected for the paint and printing inks industry. Fatty alcohol ethoxylates in many cases fail to achieve the good properties of the alkylphenol-ethoxylates. Since they lack groups capable of adsorption, the pigment wetting properties are less pronounced. Moreover, the nonadsorbed portion of this product group, in particular, has the undesirable effect of stabilizing the foam, which can be suppressed only with the aid of substances having a strong defoaming action, which, in turn, induce other adverse phenomena, such as unwanted surface defects. The use of numerous dispersing additives also has a negative impact on the water resistance or light stability of coatings.

It is known to use of polyethylene glycol ethers as foam suppressant additives in low-foam aqueous cleaning products (EP-A-0 303 928, DE-A42 25 236), for papermaking (DE-A-22 25 318), or to use mixed polyglycol derivatives—containing oxyethylene and oxypropylene—as wetting agents in inks for inkjet printers (EP-A-0 447 896), and as foam suppressant additives in dishwashing compositions (U.S. Pat. No. 4,836,951).

However, applications of block copolymers containing styrene oxide in the coatings and printing inks industry are largely unknown. One exception (DE-A-198 06 964) is constituted by polystyrene oxide-block(b)-polyalkylene oxide copolymers which are reacted starting from a monofunctional starter alcohol by sequential addition reaction of at least 2 mol of styrene oxide and an alkylene oxide and subsequent phosphorylation to give the corresponding phosphoric esters.

Therefore, there is a high demand for highly adsorptive pigment wetting agents which, in particular, have a minimal foam stabilizing effect.

In particular, there should also be a positive effect on other coatings properties, such as, for example, the water resistance of coatings produced, or optical properties such as gloss and haze.

OBJECTS OF THE INVENTION

It is an object of the present invention to meet the above-mentioned requirements, in the context of which a high pigment affinity ought to go hand in hand with a low tendency toward foam stabilization, without adverse effects on other, essential coatings properties.

SUMMARY OF THE INVENTION

This object is achieved in accordance with the invention, in a first embodiment, by means of block-copolymeric polyalkylene oxides of the general formula I:

$$R^1O(SO)_a(EO)_b(PO)_c(BO)_dR^2, \qquad (I)$$

where
- $R^1$ is a straight-chain or branched or cycloaliphatic radical, preferably having 8 to 13 carbon atoms,
- $R^2$ is hydrogen, an acyl radical, alkyl radical or carboxylic acid radical, preferably having in each case 1 to 8 carbon atoms,
- SO is styrene oxide,
- EO is ethylene oxide,
- PO is propylene oxide,
- BO is butylene oxide, and
- a is from about 1 to about 1.9,
- b is from about 3 to about 50,
- c is from 0 to about; 3, and
- d is from 0 to about 3,
- a, c or d being other than 0, and b being>=a+c+d.

DETAILED DESCRIPTION OF THE INVENTION

An important factor in obtaining the properties of the compounds are the numerical values of the indices a, b, c and d. Indice a indicates the number of styrene oxide groups, which, especially in the case of hydrophobic pigment surfaces, provides for high adsorption a here has a value of from about 1 to about 1.9. Indice b defines the number of ethylene oxide groups. It being possible for b to adopt values of from about 3 to about 50, preferably from 10 to 30. Indice c defines the number of propylene oxide groups and has a value of from 0 to about 3, preferably from about 1 to about 3. Indice d determines the number of butylene oxide groups and likewise has a value of from 0 to about 3, preferably 1. The skilled worker is well aware that the compounds are present in the form of a mixture having a distribution governed essentially by laws of statistics. It is the case that mixed alkoxylates are intended for use in accordance with the invention. By means of the different alkylene oxide monomers and their fraction in the overall polymer it is possible to exert specific control over the hydrophobic/hydrophilic balance such that it is possible to tailor any steric requirements of the pigment surface, and, in particular, to tailor the compatibility in the respective coating system. The alkylene oxide groups may be arranged at random or in blocks. Particular preference is given to block arrangements with fairly hydrophobic terminal groups such as propylene oxide or, in particular, butylene oxide. The ratio of the molar amounts of the ethylene oxide groups to the other hydrophobic alkylene oxide groups is as follows: $b >= a+c+d$. It has been found that the structures of the polymers are of critical importance to the advantages achieved in accordance with the invention.

Another important factor is the structures of the straight-chain or branched or cycloaliphatic radicals $R^1$, which can be used to control the space requirement of the surfactants at interfaces. For many applications, branched aliphatic radicals $R^1$ are advantageous for foam suppression. Especially preferred are branched $C_9$ alcohols as starting agents for the alkoxylation. Particular preference is given to 3,5,5-trimethylhexan-1-yl and 2,6-dimethylheptan-4-yl radicals; the skilled worker is well aware that the alcohols on which these radicals are based are present in particular in the form of isomeric mixtures, the particular isomer mixture being heavily dependent on the respective process conditions.

It is know in the art that fatty alcohol polyglycol ethers are substances which are prepared on the industrial scale primarily by addition reaction of ethylene oxide and/or propylene oxide in the presence of acidic or basic catalysts of the prior art, preferably under pressure and at elevated temperature. Depending on the nature of the catalyst used, the products may have a more or less narrowed homolog distribution.

The hydroxyl-terminated polyalkylene oxides formed in this way may also, however, be esterified with carboxylic acids and/or their anhydrides in order to cap the OH group. The esterification reaction may be carried out using aliphatic or aromatic carboxylic acids having 2 to 18 carbon atoms. The esterification may be performed in a conventional manner with acidic catalysis. Instead of the esterification, etherification may also be chosen as the endgroup-capping reaction. For this purpose, the compounds are reacted, in accordance with the prior art, with aromatic or aliphatic, straight-chain or branched alkyl halides under the conditions of the Williamson ether synthesis. The reaction with methyl chloride is particularly preferred. In this way the hydroxyl endgroups may be etherified either partially or completely.

Polystyrene oxide-block(b)-polyalkylene oxide copolymers which in accordance with the prior art are reacted starting from a monofunctional starter alcohol by sequential addition of at least 2 mol of styrene oxide and an alkylene oxide and subsequent phosphorylation to give the corresponding phosphoric esters, however, have been found from experience to have the consequence of unwanted foam stabilization. The prior art cited above does not mention that the use of branched starter alcohols or the use of additional hydrophobic alkylene oxide monomers would be advantageous.

Block polyalkylene oxides of this kind, containing for example from about 1.0 to about 1.9 mol of styrene oxide, are not known. They are highly active surfactants, especially highly active emulsifiers, and as such are ideally suited, for example, to the preparation of emulsion polymers. The block-copolymeric poly-alkylene oxides of the invention may be used alone or in combination. In some cases it is also advantageous to combine these polyalkylene oxides with other, prior all ionic or nonionic surfactants. In particular, in order to prepare low-foam pigment pastes, combination with acetylenediol surfactants, such as 2,4,7,9-tetramethyldecynediol (Surfynol® 104, Air Products), is particularly advisable.

Examples of polyalkylene oxides that are particularly suitable in accordance with the invention are the following:

a. $(3,5,5\text{-trimethyl-1-hexanol})(SO)_1(EO)_5H$
b. $(3,5,5\text{-trimethyl-1-hexanol})(SO)_1(EO)_9H$
c. $(3,5,5\text{-trimethyl-1-hexanol})(SO)_1(EO)_{12}(PO)_3H$
d. $(2,6\text{-dimethyl-4-heptanol})(SO)_1(EO)_9(BO)_1H$
e. $(3,5,5\text{-trimethyl-1-hexanol})(SO)_{1.9}(EO)_9H$
f. $(3,5,5\text{-trimethyl-1-hexanol})(SO)_1(EO)_9CH_3$ Aqueous pigment pastes are prepared using from about 2.0 to about 200% by weight of the polyalkylene oxides of the invention and also polyalkylene oxides where a is from 1 to 1.9, preferably from about 5.0 to about 100% by weight (based on the weight of the pigments). For use in accordance with the invention, the polyalkylene oxides, used alone or in combination, may be mixed beforehand with the pigments for dispersion or dissolved directly in the aqueous or solvent-containing dispersion medium prior to, or simultaneously with, the addition of the pigments and any solids. The skilled worker is well aware that the polyalkylene oxides can of course also be combined with other, conventional pigment wetting additives and resins.

Pigments which may be specified in this context include, for example, organic and inorganic pigments, and also carbon blacks.

As inorganic pigments, mention may be made by way of example of titanium dioxides and iron oxides. Organic pigments that may be considered include, for example, azo pigments, metal complex pigments, anthraquinonoid pigments, phthalocyanine pigments, polycyclic pigments, especially those of the thioindigo, quinacridone, dioxazine, pyrrolopyrrole, naphthalenetetracarboxylic acid, perylene, isoamidolin(one), flavanthrone, pyranthrone, or isoviolanthrone series. With particular preference, the dispersing additives of the invention are suitable for preparing aqueous carbon black (gas black) pastes.

Fillers that may be dispersed, for example, in aqueous coating materials are, for example, those based on kaolin, talc, other silicates, chalk, glass fibers, glass beads, or metal powders.

Suitable coating systems in which the pigment pastes of the invention may be incorporated are any desired aqueous one- or two-component (1K or 2K) coating materials, and also nonpolar low-solvent or solvent-free coating systems. Examples that may be mentioned include aqueous 1K coating materials, such as those based on alkyd, acrylate, epoxy, polyvinyl acetate, polyester, or polyurethane resins, or aqueous 2K coating materials, examples being those based on hydroxyl-containing polyacrylate or polyester resins with melamine resins or blocked or unblocked polyisocyanate resins as crosslinkers. Mention may also be made of polyepoxy systems. Low-solvent coating materials that may be mentioned include, in particular, those based on long-oil alkyd oils.

In the examples below, the preparation of the compounds of the invention is described first of all. There follow performance examples to demonstrate the properties of the compounds of the invention and, for comparison therewith, properties achievable with known products of the prior art.

It is understood and well known to the skilled worker that these examples depict only a selection of the possibilities that exist, and are in no way to be regarded as any restriction.

WORKING EXAMPLES

Preparation Examples

Synthesis of Polyalkylene Oxide A1

3364 g (23.4 mol) of trimethylhexanol and 163 g (2.3 mol) of potassium methoxide were charged to a reactor. After thorough blanketing with ultrapure nitrogen, this initial charge was heated to 110° C. and 3082 g (25.4 mol) of styrene oxide were added over the course of an hour. After a further two hours, the addition of the styrene oxide was at an end, evident from a residual styrene oxide content of <0.1% according to GC. Subsequently, 3392 g (77.1 mol) of ethylene oxide were metered into the reactor at a rate such that the internal temperature did not exceed 120° C. and the pressure did not exceed 6 bar. After all of the ethylene oxide had been introduced, the temperature was maintained at 115° C. until a constant manometer pressure indicated the end of the afterreaction. Finally, at from 80 to 90° C., the unreacted residual monomers were removed under reduced pressure. The product obtained was neutralized using phosphoric acid, the water was removed by distillation and the potassium phosphate formed was removed by filtration together with a filtering aid.

The molecular weight from the determination of the hydroxyl number, with an assumed functionality of 1, was M=467 g/mol.

The compounds A2 to A6 of the invention, and for use in accordance with the invention, were prepared analogously in accordance with prior art processes:

| Number | $R^1$ | a | b | C | d | $R^2$ | M |
|---|---|---|---|---|---|---|---|
| A1 | Trimethyl-hexanyl | 1.0 | 5 | 0 | 0 | H | 467 |
| A2 | Trimethyl-hexanyl | 1.0 | 9 | 0 | 0 | H | 650 |
| A3 | Trimethyl-hexanyl | 1.0 | 12 | 3 | 0 | H | 925 |
| A4 | Dimethyl-heptanyl | 1.0 | 9 | 0 | 1 | H | 720 |
| A5 | Trimethyl-heptanyl | 1.9 | 9 | 0 | 0 | H | 750 |
| A6 | Trimethyl-heptanyl | 1.0 | 9 | 0 | 0 | $CH_3$ | 664 |

A further surfactant mixture investigated, A7, comprised a 1:1 mixture of the polyalkylene oxide A2 and 2,4,7,9-tetramethyldecynediol.

As comparative examples, use was made of a fatty acid ethoxylate B1 (Tego® Dispers 740 W, Tego Chemie Service), a nonylphenol ethoxylate containing 9 mol of ethylene oxide, B2 (Berol® 09, Akzo), and an ethoxylated (10 mol) oleyl alcohol, B3 (Alkanol O10, Tego Chemie Service).

Performance Examples

The following procedure was used to examine the activity of the polyalkylene oxides as a dispersing additive, and the comparative compounds:

Preparation of the Pigment Pastes

To prepare the pigment pastes, the respective additives were mixed with water and, if appropriate, antifoams and then the pigments were added. Dispersion was carried out following addition of grinding media (glass beads 2–3 mm, same volume as the pigment paste) for one hour (inorganic pigments) or two hours (organic pigments and carbon black) in a Skandex shaker with air cooling.

Formulation of the Blue Pastes

The blue pastes were formulated as follows (amounts in % by weight):

| | |
|---|---|
| 46.5 | water |
| 12.2 | additive |
| 0.4 | defoamer (Tego ® Foamex 830, Tego Chemie Service GmbH) |
| 40.8 | Heliogenblau 7080, BASF |
| 0.1 | Bodoxin ® AH, Bode-Chemie |

Formulation of the Black Pastes

The black pastes were formulated as follows (amounts in % by weight):

| | |
|---|---|
| 58.9 | water |
| 15.0 | additive |
| 0.4 | defoamer (Tego ® Foamex 830, Tego Chemie Service GmbH) |
| 0.1 | Bodoxin ® AH, Bode-Chemie |
| 25.6 | Raven ® 1170, Columbian |

Formulation of the Red Iron Oxide Pastes

| | |
|---|---|
| 52.6 | water |
| 6.1 | additive |
| 0.1 | Bodoxin ® AH, Bode-Chemie |
| 0.4 | defoamer (Tego ® Foamex 830, Tego Chemie Service GmbH) |
| 40.8 | red iron oxide Bayferrox ® M130, Bayer |

Test Coating Materials

Two commercially available white paints were used, based on an all-acrylate dispersion (Mowilith® DM771) and on a solvent-free long-oil alkyd (Alkydal® F681, 75% strength).

White paint 1 (aqueous)

| | |
|---|---|
| Water | 3.8 |
| Additol ® XW330 | 0.3 (wetting agent, Vianova) |
| 2% strength aqueous solution of Tylose ® MH2000 K | 9.4 (thickener, Clariant) |
| 10% strength aqueous solution of Calgon ® N | 1.1 (wetting agent, Henkel) |
| Foamex 8020 | 0.4 (defoamer, Tego ® Chemie Service) |
| Kronos 2065 | 22.6 (titanium dioxide, Kronos) |
| Omyacarb ® 5 GU | 16.8 (filler, Omya) |
| Micro Talc AT1 | 3.8 |
| China Clay B | 2.0 |
| Mergal ® K10N | 0.2 (preservative, Allied Signal) |
| Mowilith ® DM771 | 37.5 (all-acrylate dispersion, Clariant) |
| Ammonia (25% strength) | 0.2 |
| White spirit | 1.1 |
| Butyl diglycol acetate | 0.8 |

White paint 2 (solvent-based)

| | |
|---|---|
| Alkydal ® F681, 75% | |
| strength | 50.0 (long-oil alkyd Bayer) |
| Bayertitan ® R-KB 2 | 26.0 (titanium dioxide, Kerr McGee) |
| Octa Soligen Ca. 4 | 2.0 (siccative, Borchers) |
| Bentone 34, 10% | |
| Suspension | 1.4 (10 p. Bentone 34, 10 p. Tego Dispers 700, 80 p. white spirit) |
| K60 | 18.0 (crystal oil) |
| Octa Soligen ® cobalt 6 | 0.3 (Borchers) |
| Octa Soligen ® zirconium 18 | 2.0 (Borchers) |
| Ascinin ® R conc. | 0.3 (Byk) |

To prepare tinted paints, color paste and white paint are mixed using a brush in a ratio of 1 g of color pigment to 100 g of white paint.

Test of the Paste Stabilities

In order to determine the paste stabilities, the achievable initial viscosities and the viscosities after four weeks of storage at 50° C. are determined at two different shear rates (20 1/s and 1000 1/s).

Blue pastes

| Sample | Viscosity/Pas immediate at 20 l/s | Viscosity/Pas immediate at 1000 l/s | Viscosity/Pas after 4 weeks at 50° C. at 20 l/s | Viscosity/Pas after 4 weeks at 50° C. at 1000 l/s |
|---|---|---|---|---|
| A1 | 800 | 150 | 1050 | 180 |
| A2 | 700 | 130 | 900 | 150 |
| A3 | 720 | 134 | 1000 | 145 |
| A4 | 680 | 120 | 880 | 140 |
| A5 | 600 | 125 | 870 | 138 |
| A6 | 730 | 140 | 920 | 162 |
| A7 | 900 | 150 | 1030 | 158 |
| B1 | 1400 | 130 | 2500 | 200 |
| B2 | 800 | 130 | 1100 | 150 |
| B3 | 860 | 150 | 1600 | 190 |

Black pastes

| Sample | Viscosity/dPas immediate at 20 l/s | Viscosity/dPas immediate at 1000 l/s | Viscosity/dPas after 4 weeks at 50° C. at 20 l/s | Viscosity/dPas after 4 weeks at 50° C. at 1000 l/s |
|---|---|---|---|---|
| A1 | 1000 | 120 | 1180 | 140 |
| A2 | 900 | 100 | 1050 | 120 |
| A3 | 920 | 110 | 1100 | 130 |
| A4 | 880 | 100 | 1030 | 120 |
| A5 | 800 | 108 | 1010 | 130 |
| A6 | 930 | 120 | 1090 | 140 |
| A7 | 1100 | 130 | 1230 | 150 |
| B1 | 1700 | 120 | no stability | |
| B2 | 1000 | 130 | 1200 | 145 |
| B3 | 1050 | 125 | 1700 | 160 |

Red iron oxide pastes

| Sample | Viscosity/dPas immediate at 20 l/s | Viscosity/dPas immediate at 1000 l/s | Viscosity/dPas after 4 weeks at 50° C. at 20 l/s | Viscosity/dPas after 4 weeks at 50° C. at 1000 l/s |
|---|---|---|---|---|
| A1 | 790 | 150 | 1000 | 170 |
| A2 | 650 | 130 | 900 | 160 |
| A3 | 630 | 160 | 870 | 180 |
| A4 | 615 | 140 | 820 | 150 |
| A5 | 700 | 145 | 900 | 155 |
| A6 | 720 | 158 | 890 | 170 |
| A7 | 800 | 165 | 1010 | 173 |
| B1 | 1300 | 150 | no stability | |
| B2 | 800 | 140 | 950 | 170 |
| B3 | 900 | 160 | no stability | |

The excellent stability of pigment pastes of the invention is readily evident from the small increase in viscosity in each case.

Test of the Dispersing Properties

Drawdown of the test formulations with 200 μm wet film thickness; after 5 minutes' drying, rubout test on ⅓ of the area. Colorimetric measurement of the drawdowns by means of a spectrophotometer model XP 68 from X-Rite. Determination of the degree of gloss and haze by means of the Haze-Gloss instrument from Byk-Gardner.

Dispersion coating based on Mowilith® DM771/blue

| Sample | Color strength F | Delta E after rubout |
|---|---|---|
| A1 | 46 | 0.4 |
| A2 | 47 | 0.2 |
| A3 | 48 | 0.4 |
| A4 | 48 | 0.2 |
| A5 | 46 | 0.3 |
| A6 | 45 | 0.1 |
| A7 | 46 | 0.3 |
| B1 | 43 | 0.8 |
| B2 | 46 | 0.4 |
| B3 | 44 | 0.6 |

Dispersion coating based on Mowilith® DM771/red

| Sample | Color strength F | Delta E after rubout |
|---|---|---|
| A1 | 37 | 0.7 |
| A2 | 38 | 0.4 |
| A3 | 38 | 0.5 |
| A4 | 39 | 0.3 |
| A5 | 37 | 0.4 |
| A6 | 37 | 0.3 |
| A7 | 38 | 0.6 |
| B1 | 34 | 1.2 |
| B2 | 36 | 0.7 |
| B3 | 34 | 0.9 |

Dispersion coating based on Mowilith® DM771/gray

| Sample | color strength F | Delta E after rubout |
|---|---|---|
| A1 | 156 | 0.5 |
| A2 | 160 | 0.2 |
| A3 | 159 | 0.4 |
| A4 | 158 | 0.2 |
| A5 | 160 | 0.4 |
| A6 | 157 | 0.1 |
| A7 | 157 | 0.3 |

-continued

Alkyd coating based on Alkydal® F681/blue

| Sample | color strength F | Delta E after rubout |
|---|---|---|
| B1 | 152 | 0.8 |
| B2 | 155 | 0.4 |
| B3 | 151 | 0.6 |

Alkyd coating based on Alkydal® F681/red

| Sample | Color strength F | Delta E after rubout |
|---|---|---|
| A1 | 41 | 0.2 |
| A2 | 43 | 0.1 |
| A3 | 42 | 0.3 |
| A4 | 43 | 0.1 |
| A5 | 44 | 0.2 |
| A6 | 44 | 0.1 |
| A7 | 42 | 0.2 |
| B1 | 38 | 0.5 |
| B2 | 42 | 0.2 |
| B3 | 39 | 0.3 |

Alkyd coating based on Alkydal F681/gray

| Sample | Color strength F | Delta E after rubout |
|---|---|---|
| A1 | 26 | 0.4 |
| A2 | 28 | 0.3 |
| A3 | 29 | 0.4 |
| A4 | 30 | 0.2 |
| A5 | 27 | 0.4 |
| A6 | 30 | 0.3 |
| A7 | 28 | 0.5 |
| B1 | 24 | 1.0 |
| B2 | 27 | 0.5 |
| B3 | 25 | 0.8 |

| Sample | Color strength F | Delta E after rubout |
|---|---|---|
| A1 | 172 | 0.1 |
| A2 | 174 | 0.1 |
| A3 | 173 | 0.2 |
| A4 | 170 | 0.1 |
| A5 | 174 | 0.1 |
| A6 | 175 | 0.1 |
| A7 | 172 | 0.2 |
| B1 | 168 | 0.5 |
| B2 | 172 | 0.1 |
| B3 | 170 | 0.4 |

In evidence were the favorable color strength development achievable, and the rubout test, which was favorable in all cases, by virtue of the dispersing additives of the invention.

This was also the case in particular, markedly so, in comparison with the Comparative Examples.

The above description is intended to be illustrative and not limiting. Various changes and modifications in the embodiments described herein may occur to those skilled in the art. Those changes can be made without departing from the scope or spirit of the invention.

What is claimed is:

1. A polyalkylene oxide of the general formula $$R^1O(SO)_a(EO)_b(PO)_c(BO)_dR^2, \quad (I)$$

where
  $R^1$ is a straight-chain or branched or cycloaliphatic radical,
  $R^2$ is hydrogen, an acyl radical, alkyl radical or carboxylic acid radical,
  SO is styrene oxide,
  EO is ethylene oxide,
  PO is propylene oxide,
  BO is butylene oxide, and
  a is from about 1 to about 1.9,
  b is from about 3 to about 50,
  c is from 0 to about 3, and
  d is from 0 to about 3,
  b being $>=a+c+d$.

2. A polyalkylene oxide as claimed in claim 1, wherein $R^1$ is a straight-chain or branched or cycloaliphatic radical having 8 to 13 carbon atoms and $R^2$ is hydrogen, an acyl radical, alkyl radical or a carboxylic acid radical having in each case 1 to 8 carbon atoms.

3. A polyalkylene as claimed in claim 2, wherein
  a is from 1 to 1.9,
  b is from 3 to 50,
  c if from 0 to 3, and
  d is from 0 to 3.

4. A polyalkylene oxide as claimed in claim 1, wherein $R^1$ is a branched aliphatic radical having from 9 to 13 carbon atoms.

5. A polyalkylene oxide as claimed in claim 1, wherein the alkylene oxide radicals are arranged blockwise.

6. A polyalkylene oxide as claimed in claim 1, wherein c is from 1 to 3.

7. A polyalkylene oxide as claimed in claim 1, wherein d is from 1 to 3.

8. A polyalkylene oxide as claimed in claim 1, wherein $R^1$ is selected from the group consisting of isononanyl, 3,5,5-trimethylhexanyl and 2,6-dimethylheptan-4-yl.

9. A polyalkylene oxide as claimed in claim 1, which is
  (3,5,5-trimethyl-1-hexanol)(SO)$_1$(EO)$_5$H;
  (3,5,5-trimethyl-1-hexanol)(SO)$_1$(EO)$_9$H;
  (3,5,5-trimethyl-1-hexanol)(SO)$_1$(EO)$_{12}$(PO)$_3$H;
  (2,6-dimethyl-4-heptanol)(SO)$_1$(EO)$_9$(BO)$_1$H;
  (3,5,5-trimethyl-1-hexanol)(SO)$_{1.9}$(EO)$_9$H; or
  (3,5,5-trimethyl-1-hexanol)(SO)$_1$(EO)$_9$CH$_3$.

10. A method of stabilizing an O/W or W/O emulsion which comprises adding a polyalkylene oxide as claimed in claim 1 to said emulsion.

11. A laundry detergent or cleaning product which comprises a polyalkylene oxide as claimed in claim 1.

12. A stabilizer for preparing emulsion polymers which comprises a polyalkylene oxide as claimed in claim 1.

13. In a process for preparing an emulsion polymer, the improvement which comprises adding a stabilizer comprising a polyalkylene oxide as claimed in claim 1.

14. A low-foam pigment wetting agent which comprises a polyalkylene oxide of the general formula $$R^1O(SO)_a(EO)_b(PO)_c(BO)_dR^2, \quad (I)$$

where
  $R^1$ is a straight-chain or branched or cycloaliphatic radical,
  $R^2$ is hydrogen, an acyl radical, alkyl radical or carboxylic acid radical, SO is styrene oxide,
EO is ethylene oxide,
PO is propylene oxide,
BO is butylene oxide, and
a is from 0 to about 1.9,
b is from about 3 to about 50,
c is from 0 to about 3, and
d is from 0 to about 3,
a, c or d being other than 0 and b being >=a+c+d.

15. The low-foam wetting agent as claimed in claim 14, wherein $R^1$ is a branched aliphatic radical having from 9 to 13 carbon atoms.

16. A pigment paste, an aqueous, low-solvent or solvent-free coating material or a printing ink which comprises a pigment and from about 2 to about 200% of the low-foam pigment wetting agent as claimed in claim 14, based upon the weight of the pigment.

17. The low-foam pigment wetting agent as claimed in claim 14, which further comprises an ionic or nonionic surfactant.

18. The low-foam pigment wetting agent as claimed in claim 17, wherein the surfactant is an acetylenediol surfactant.

19. The low-foam pigment wetting agent as claimed in claim 18, wherein the acetylenediol surfactant is 2,4,7,9-tetramethyldecynediol and the wetting agent comprises from about 30 to about 8 parts by weight of the polyalkylene oxide of formula (I) and about 20 to 70 parts by weight of 2,4,7,9-tetramethyldecynediol.

* * * * *